US005733669A

United States Patent [19]

Veyhl et al.

[11] Patent Number: 5,733,669

[45] Date of Patent: Mar. 31, 1998

[54] RESISTIVE COMPONENT COMPRISING A CRSI RESISTIVE FILM

[75] Inventors: Rainer Veyhl, Heide; Rudolf Thyen, Bothkamp; Henning Boneβ, Wedel, all of Germany

[73] Assignee: U.S. Philips Corporation, New York, N.Y.

[21] Appl. No.: 612,152

[22] Filed: Mar. 7, 1996

[30] Foreign Application Priority Data

Mar. 9, 1995 [DE] Germany .......................... 195 08 387.3

[51] Int. Cl.$^6$ .............................. B32B 9/00; H01C 1/012

[52] U.S. Cl. .......................... 428/698; 428/689; 428/699; 428/701; 428/702; 428/469; 428/472; 428/336; 338/308; 338/314

[58] Field of Search .................................... 428/427, 428, 428/689, 698, 704, 210, 699, 701, 702, 469, 472, 336; 338/308, 314

[56] References Cited

U.S. PATENT DOCUMENTS

| | | | |
|---|---|---|---|
| 3,472,688 | 10/1969 | Hayashi et al. | 428/428 |
| 4,343,986 | 8/1982 | Mitani et al. | 219/216 |
| 4,392,992 | 7/1983 | Paulson et al. | 428/428 |
| 4,520,342 | 5/1985 | Vugts | 428/428 |
| 4,591,821 | 5/1986 | Paulson et al. | 338/308 |
| 4,682,143 | 7/1987 | Chu et al. | 338/307 |
| 5,011,732 | 4/1991 | Takeuchi et al. | 428/209 |
| 5,218,335 | 6/1993 | Nakano et al. | 338/308 |
| 5,235,313 | 8/1993 | Narizuka et al. | 338/216 |
| 5,264,272 | 11/1993 | Tanabe et al. | 428/210 |
| 5,543,208 | 8/1996 | Hasler | 428/210 |

FOREIGN PATENT DOCUMENTS

| | | | |
|---|---|---|---|
| 0220926A2 | 5/1987 | European Pat. Off. | H01C 7/00 |

*Primary Examiner*—Patrick Ryan
*Assistant Examiner*—Cathy F. Lam

[57] ABSTRACT

A resistive component which is composed of one or more resistive films which, if necessary, may be provided on a substrate, and at least one of which is on the basis of CrSi, the resistive film on the basis of CrSi comprising 5–50 at. % Cr, 10–70 at. % Si, 5–50 at. % O and at least one element of the group formed by B, C and N in a concentration of 1–50 at. %. The advantageous properties of the resistive component in accordance with the invention are based on the reactive incorporation of oxygen and carbon or oxygen and nitogen or oxygen and carbon and nitrogen into resistive films on the basis of CrSi.

9 Claims, 2 Drawing Sheets

RESISTIVE COMPONENT COMPRISING A CRSI RESISTIVE FILM

BACKGROUND OF THE INVENTION

1. Field of the Invention

The invention relates to a resistive component which is composed of one or more resistive films which, if necessary, may be provided on a substrate, and at least one of which is on the basis of CrSi.

2. Discussion of the Related Art

As a result of the ongoing miniaturization of electronic devices, precision resistive components having high resistance are required which do not only meet the precision requirements but which also keep pace with this trend in terms of geometrical dimensions and heat dissipation. Heat dissipation can be reduced by using high-resistance components. Resistance values >1 MΩ in combination with geometrical dimensions of the resistive component of approximately 1 mm are required.

By suitably structuring the resistive film (a helical structure in the case of cylindrical resistive elements and a meandering structure in the case of flat resistive elements) the basic value of the resistive film can be changed in such a manner that a specific final value is obtained. For stability reasons, a minimum path width as well as a minimum film thickness must be observed, so that the highest possible basic value/final value ratio is limited by the geometrical dimensions of the resistive element. Consequently, both requirements, i.e. a small physical size and a low heat dissipation, can only be achieved by using resistive-film materials having the highest possible resistivity.

In EP 0220 926 A2 an improved resistive material in the form of a thin-film chromium-silicon-carbon resistive material is proposed which comprises approximately 25 to 35 wt. % chromium, approximately 40 to 55 wt. % silicon and approximately 20 to 30 wt. % carbon, and which is characterized by a resistance value of more than 800 and less than 1,200 Ohm/inch$^2$, a temperature coefficient of resistance below 200 ppm/K and an absolute life and trimming stability of less than 0.1% of said resistance value.

SUMMARY OF THE INVENTION

It is an object of the invention to provide a resistive component which enables a minimal TCR, for example ±100 ppm/K, to be attained, and the use of which, in particular for resistive components having high resistance values of the order of 1 MΩ in combination with geometrical dimensions of approximately 1 mm, enables the spread in resistance values within one coating cycle, as well as the reproducibility of specific resistance values from coating cycle to coating cycle and hence the efficiency of a coating process relative to customary coating processes, to be improved.

This object is achieved in accordance with the invention by a resistive component which is composed of one or more resistive films which, if necessary, may be provided on a substrate, and at least one of which is on the basis of CrSi, characterized in that the resistive film on the basis of CrSi comprises 5–50 at. % Cr, 10–70 at. % Si, 5–50 at. % O and at least one element of the group formed by B, C and N in a concentration of 1–50 at. %.

The invention is essentially based on the reactive incorporation of oxygen and carbon or oxygen and nitogen or oxygen and carbon and nitrogen into resistive films on the basis of CrSi. Such a resistive component is characterized in that it exhibits a very small spread and a much improved reproducibility of the resistance values. It is further characterized in that it has a high resistance with resistivity values of almost 0 ppm/K ($\rho_{TCR,0}$) to above 100,000 μΩcm. Therefore, said component can very suitably be used as a high-resistance precision resistive component for extreme climatic strain and electric stress. In addition, said component is temperature-resistant, so that even at temperatures of approximately 500° C. oxidation of the component is negligibly small. Moreover, it can be tempered in TC100-range. If it is produced as a surface resistor by means of thin-film technology, the following values are obtained: R>20 kOhm/square (this corresponds to a resistivity >200,000 μOhm cm at a film thickness of 100 nm) and TCR<100 ppm/K.

A resistive component is preferred which is characterized in that the resistive film on the basis of CrSi comprises 20–40 at. % Cr, 10–30 at. % Si, 10–40 at. % O and at least one element of the group formed by B, C and N in a concentration of 1–40 at. %.

In a further preferred resistive component the resistive film on the basis of CrSi comprises 25–35 at. % Cr, 15–25 at. % Si, 20–30 at. % O, and at least one element of the group formed by B, C and N in a concentration of 1–30 at. %.

It is also preferred that the resistive film on the basis of CrSi comprises 10–30 at. % Cr, 20–60 at. % Si, 20–50 at. % O, and at least one element of the group formed by B, C and N in a concentration of 1–40 at. %.

It is particularly preferred that the resistive film on the basis of CrSi comprises 16–20 at. % Cr, 35–45 at. % Si, 20–30 at. % O and 15–25 at. % C.

It may also be preferred that the resistive film on the basis of CrSi additionally comprises 1–20 at. % hydrogen.

It may be preferred that the resistive film additionally comprises 1–5 at. % Ni, Co, Fe, Al, W, Mo, Ti, Ru or Cu. As a result, the moisture resistance of the resistive component is improved.

It may also be preferred that the thickness of the resistive film on the basis of CrSi ranges from 10 nm to 10μm.

Preferably, the substrate is composed of $Al_2O_3$, BN, AlN, Si, SiC, $Si_3N_4$ and/or $SiO_2$.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
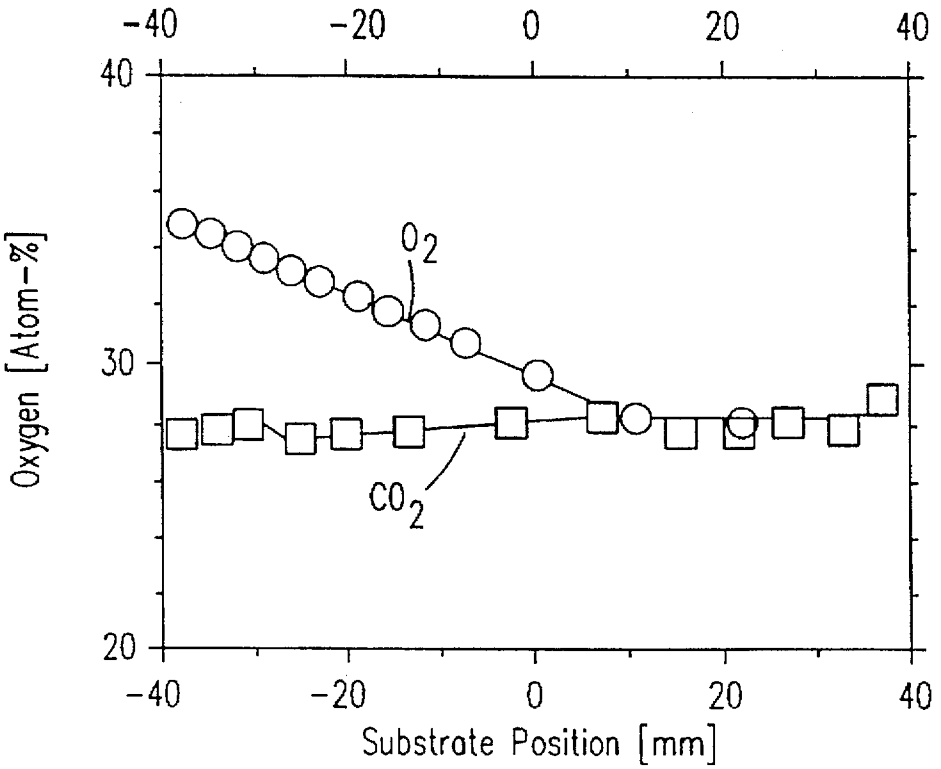
FIG. 1 shows the oxygen content in a resistive film as a function of the substrate position and the type of reactive gas.

A resistive component in accordance with the invention can be a discrete component or an integrated component. It is generally composed of one or more resistive films on a substrate and terminals. The resistive films in accordance with the invention comprise chromium, silicon, oxygen and at least one element of the group formed by boron, carbon and nitrogen. In this case, oxygen, boron, carbon and nitrogen are present in the layer in the form of oxidic, boridic, carbidic or nitridic bonds or as elementary inclusions.

The resistive films, which form the actual resistive element, may be only the resistive films in accordance with the invention or a combination of said films with conventional resistive films. Said resistive films in accordance with the invention can be combined, for example, with resistive films comprising Ni, Co, Fe, Al, W, Mo, Ti, Ru or Cu.

The resistive films are preferably provided on a substrate. Said substrate may be composed of $Al_2O_3$, BN, AlN, Si, SiC, $Si_3N_4$ and/or $SiO_2$. The thickness of the films applied to a substrate generally ranges from 10 nm to 50 μm, preferably from 50 to 500 nm.

The resistive film can be deposited on the substrate by means of conventional film-deposition methods such as dip coating, spraying or vacuum evaporation. Preferably, however, the films are provided by reactive cathode sputtering (reactive sputtering). During reactive cathode sputtering, chromium and silicon are physically sputterd by ion bombardment of a solid target, the elements O, C, B and N are intoduced into the deposition chamber as gaseous starting compounds. These gaseous starting compounds are excited by means of plasma activation and form very reactive particles which are deposited on the substrate together with the physically sputtered Cr and Si. Thus, the reactive cathode sputtering process is a combination of PVD and CVD.

Alternatively, a method can be used in which targets comprising oxides, carbides, nitrides, borides or other solid compounds of the elements O, C, B, N are physically sputtered by ion bombardment. In said method, one or more targets having the same composition or different $Cr_xSi_y$ compositions are used. Alternatively, use can be made of one or more targets having the same or different $Cr_xSi_yR_z$ compositions, in which R may be one or more of the above-mentioned elements, such as O, B, C, N or H, Ge, Ni, Co, Fe, Al, W, Mo, Ti, Ru or Cu. Between 0% and 100% (relative) of the Si content in the target can be substituted with Ge. In particular oxygen-containing $Cr_xSi_yO_z$-cermet targets proved to be suitable.

The composition x:y of the $Cr_xSi_y$ target material used ranges between 0:100 and 100:0, preferably between 20:80 and 60:40. A composition in the range between 30:70 and 50:50 proved to be very suitable. If $Cr_xSi_yR_z$ target materials are used, x:y corresponds to the above composition and (x+y):z ranges between 0:100 and 100:0, preferably between 90:10 and 50:50.

Deposition takes place in a reactive gas-containing atmosphere on to a substrate, for example, of $Al_2O_3$, AlN, BN, Si, SiC, $Si_3N_4$ and/or $SiO_2$. If $Cr_xSi_yR_z$ target materials are used, said atmosphere does not have to contain a reactive gas.

Suitable reactive gases, in which the oxygen is bonded to another element, are, for example, carbon dioxide ($CO_2$), carbon monoxide (CO), laughing gas ($N_2O$), nitrogen monoxide (NO), nitrogen dioxide ($NO_2$) or oxygen-, hydrogen- and silicon-containing reactive gases such as hexamethyl disiloxane (HMDSO), $(CH_3)_3SiOSi(CH_3)_3$) or hexamethyl cyclotrisiloxane (HMCTSO, $((CH_3)_2SiO)_3$). In comparison with water ($H_2O$), said reactive gases have the advantage that the tendency to adsorb at cold surfaces is much less pronounced, so that a reactive-gas partial pressure which is constant during the deposition process can be set without problems, for example by means of a gas-flow control device.

To increase the oxygen content of the resistive film to be deposited, molecular oxygen ($O_2$) and/or water ($H_2O$) may be added to the above-mentioned reactive gases or reactive-gas mixtures, which are at least composed of a reactive-gas type in which the oxygen is bonded to another element. To increase the carbon- and/or nitrogen- and/or boron content of the resistive film to be deposited, further reactive gases such as carbon hydrogen ($C_xH_y$) and/or molecular nitrogen ($N_2$) and/or ammonia ($NH_3$) and/or trimethyl borazole TMB, $(CH_3)_3B_3N_3$) may be added to the above-mentioned reactive gases or reactive-gas mixtures, which are at least composed of a reactive-gas type in which the oxygen is bonded to another element.

The resistive film deposited on the substrate can be pre-aged by means of a subsequent thermal aftertreatment. Said aftertreatment usually takes place in a tempering process at 200°–700° C. in air or a protective gas or a vacuum for several hours, preferably 2–6 hours at 400°–600° C. in air. In addition, the change of the film structure caused by tempering (crystallization) allows the TCR to be changed to, for example, ±100 ppm/K.

EXAMPLE 1

Oxygen- and carbon-containing CrSi films are deposited by reactive cathode sputtering in a parallel-plate high-frequency sputtering device. The pump system was composed of a turbomolecular pump (300 l/s) and a vane-type rotary fore-pump (40 $m^3$/h). The residual gas pressure was $<10^{-5}$ mbar. The reactive gas used was $CO_2$. The $CO_2$ gas flow was set at 1.1 sccm (standard cubic centimeter per minute). Using argon as the inert gas, the process pressure was set at $2\cdot10^{-2}$ mbar, which corresponds to an argon-gas flow of approximately 30 sccm. The target (ϕ=150 mm) was composed of Cr (60 at. %) and Si (40 at. %). In a one-hour coating process at a plasma power of approximately 700 W, an 1.4 μm thick film was deposited on ceramic- and silicon substrates. After the deposition process, measurements carried out on a ceramic substrate by means of van der Pauw's method showed a resistivity of 300,000 μΩcm and a TCR of–1,430 ppm/K. By electron-beam microanalysis (EBMH) it was determined that the film was of the following composition:

31 at. % Cr
19 at. % Si
26 at. % O
24 at. % C.

After tempering for three hours at 700 ° C. in air, measurements showed a resistivity of 165,000 μΩcm and a TCR of –28 ppm/K. After tempering, it was determined that the film was of the following composition:

30 at. % Cr
20 at. % Si
29 at. % O
21 at. % C

EXAMPLE 2

A further oxygen- and carbon-containing CrSi film is deposited in the coating device described in example 1 and under the same process conditions, with the exception that:

target composition: 28 at. % Cr and 72 at. % Si
reactive-gas flow: 0.85 sccm $CO_2$ After a one-hour coating process, the film thickness was 1.2 μΩm. The resistivity was 22,000 μΩcm and the TCR was −732 ppm/K. After tempering for 3 hours at 600 ° C. in air, the resistivity was 28,500 μΩcm and the TCR was −52 ppm/K. After the tempering process, the film was of the following composition:

18 at. % Cr 40 at. % Si 26 at. % O 16 at. % C.

EXAMPLE 3

By using a coating device as described in example 1 and a target composed of 28 at. % chromium and 72 at. % silicon, two resistive films were deposited.

film 1: using oxygen as the reactive gas; $O_2$ partial pressure=0.070 Pa film 2: using carbon dioxide as the reactive gas; $CO_2$partial pressure=0.043 Pa.

All other coating parameters were the same:

inert gas: argon plasma power: 0.77 kW target bias: 2.0 kV substrate bias: grounded coating time: 1 hour substrates:

eight $Al_2O_3$ ceramic substrates (10×10 mm) for electrical measurements.

one approximately 10 cm long and approximately 1 cm wide strip of polished silicon which is used to determine the film composition by means of EBMA.

Figure 2:
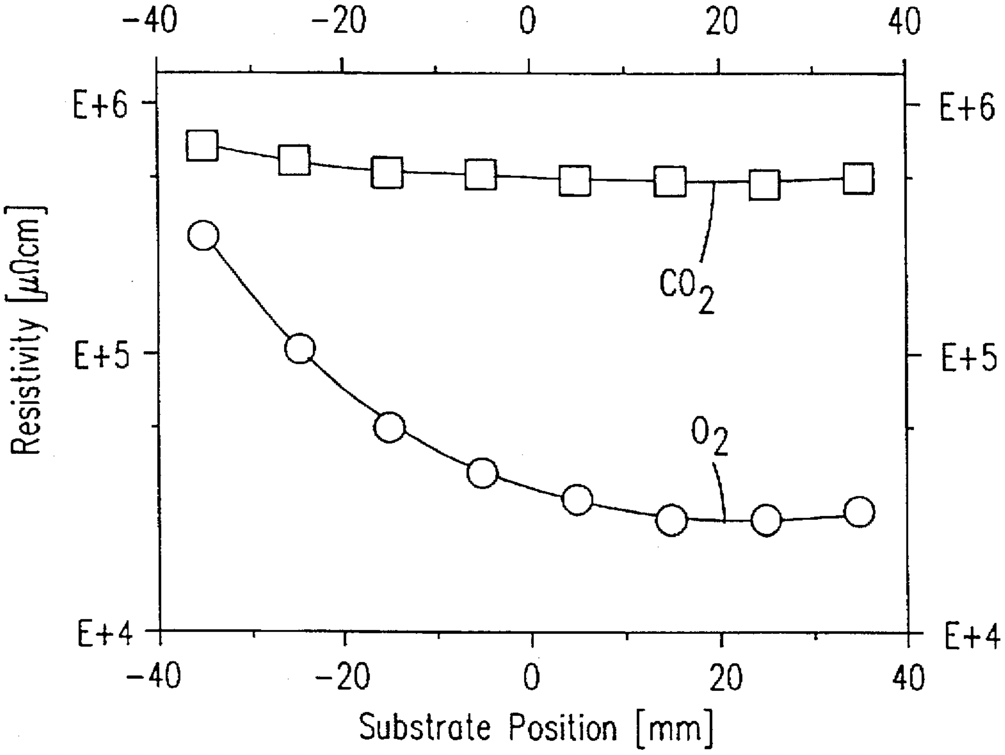
FIG. 2 shows the resistivity of a resistive film as a function of the substrate position and the type of reactive gas.

The resultant film thickness was 1.9 μm for film 1 and 1.5 μm for film II. The distribution of the oxygen contents in the films as a function of the substrate position are shown in FIG. 1. The distribution of the resistivity values as a function of the substrate position are shown in FIG. 2. This example serves to explain that under identical coating conditions, the lateral variation of the O content and hence also the variation of the resistivity is much smaller when carbon dioxide is used as the reactive gas instead of oxygen.

EXAMPLE 4

In the coating device described in example 1, and using a target composed of 28 at. % chromium and 72 at. % silicon, two experimental runs of resistive films were deposited:

experimental run I using oxygen as the reactive gas and a variable reactive-gas flow experimental run II using carbon dioxide as the reactive gas and a variable reactive-gas flow.

Figure 3:
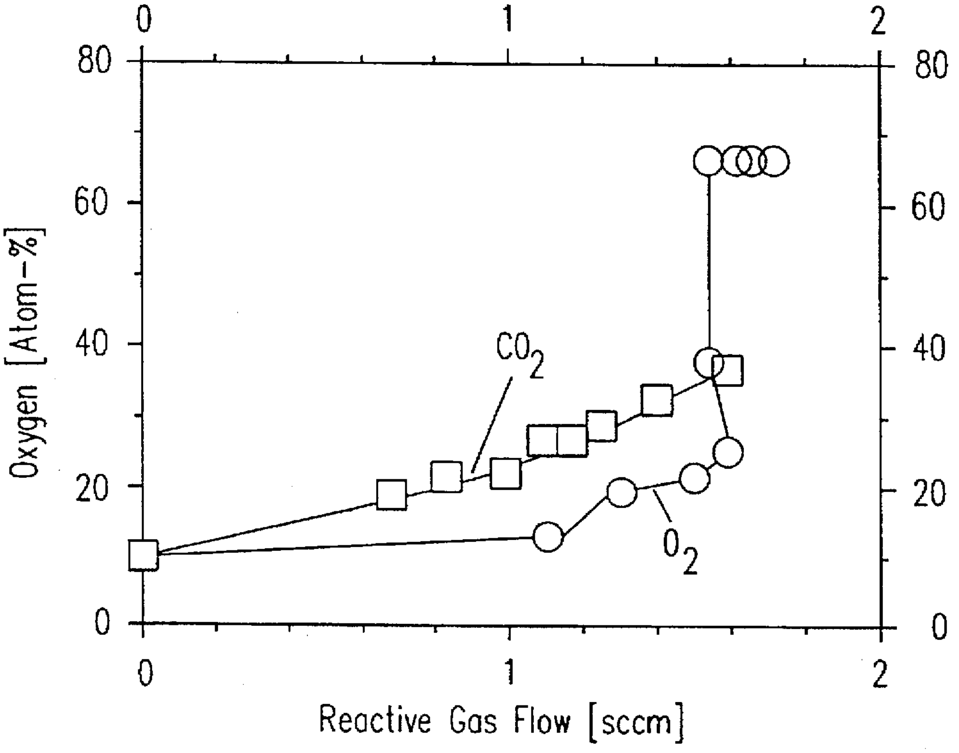
FIG. 3 shows the oxygen content in a resistive film as a function of the reactive-gas flow and the type of reactive gas.
Figure 4:
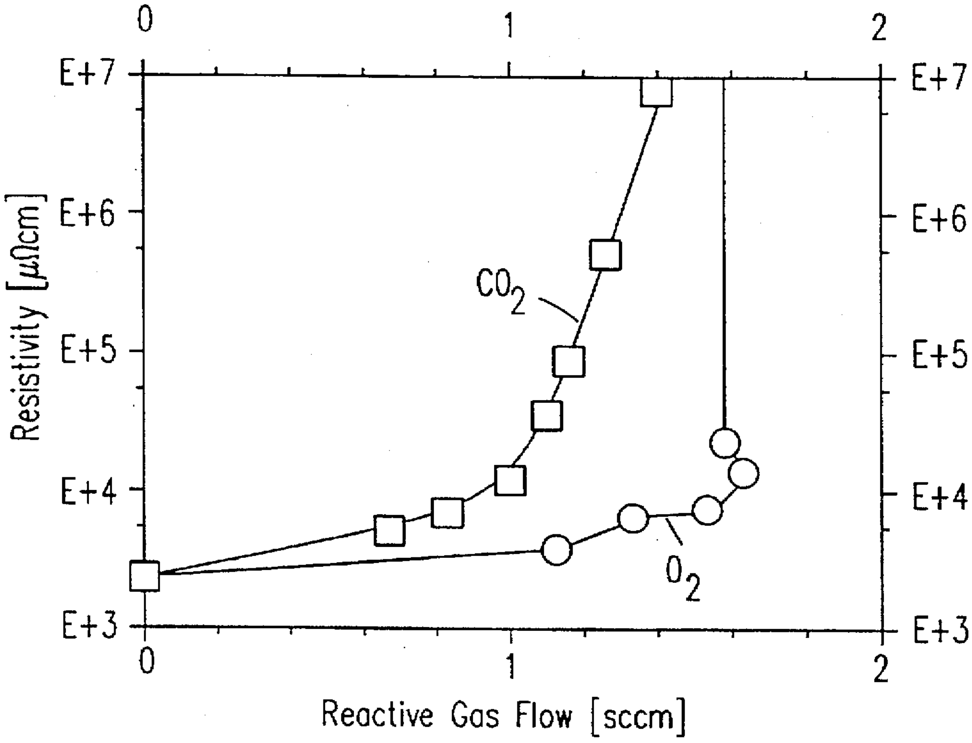
FIG. 4 shows the resistivity in a resistive film as a function of the reactive-gas flow and the type of reactive gas.

All other coating parameters were the same as in example 2. FIG. 3 shows the dependence of the resultant oxygen content on the predetermined reactive-gas flow. FIG. 4 shows the dependence of the resultant resistivity on the predetermined reactive-gas flow. The oxygen content was measured on a silicon substrate which was situated in the middle of the substrate electrode during the coating process. The resistivity was measured on a ceramic substrate which was situated in the middle of the substrate electrode during the coating process.

This example serves to explain that, when carbon dioxide is used as the reactive gas, the oxygen content increases continuously as the predetermined reactive-gas flow increases, and that in this manner high resistivity values can be reproducibly attained. If oxygen is used as the reactive gas instead of carbon dioxide, the oxygen content increases step-wise from approximately 25 at. % to 65 at. %, as a result of which it is problematic to reproducibly deposit resistive films having high resistance.

EXAMPLE 5

Oxygen- and carbon-containing CrSi films are deposited by reactive cathode sputtering in a high-frequency sputtering device, in a process in which bulk material is used. The pump system was composed of a turbomolecular pump (450 l/s) and a vane-type rotary fore-pump (30 $m^3$/h). The residual gas pressure was $<3 \cdot 10^{-6}$ mbar. $CO_2$ was used as the reactive gas.

The $CO_2$-gas flow during the coating process was 0.55 sccm. Using argon as the inert gas, the process pressure was set at $2.5 \cdot 10^{-2}$ mbar. The target was composed of Cr (28 at. %) and Si (72 at. %). Deposition took place on round aluminium-oxide ceramic at a sputtering power of 1.0 kW. After coating for 164 minutes, a surface resistance of 11.9 kΩ/square (corresponding to 119,000 μOhm at a film thickness of 100 nm) and a TCR of −457 ppm/K were attained. The spread of the surface resistance was 16%. The spread of the TCR was 53 ppm/K. After tempering for three hours at 460° C. in air, a surface resistance of 24.7 kΩ/square (corresponding to 247,000 μOhm at a film thickness of 100 nm) and a TCR of +21 ppm/K were attained. The spread of the surface resistance was 26%. The spread of the TCR was 36 ppm/K.

EXAMPLE 6

A reactive-gas mixture of $O_2$ and $CO_2$ was used in a further coating cycle in accordance with example 5. The reactive-gas flows were each set at 0.40 sccm. After coating for 165 minutes, a surface resistance of 20.4 kΩ/square (corresponding to 204,000 μOhm at a film thickness of 100 nm) and a TCR of −633 ppm/K were attained. The spread of the surface resistance was 20%. The spread of the TCR was 46 ppm/K. After a three-hour tempering process at 480° C. in air, a surface resistance of 48.7 kΩ/square (corresponding to 487,000 μOhm at a film thickness of 100 nm) and a TCR of +18 ppm/K were attained. The spread of the surface resistance was 35%. The spread of the TCR was 56 ppm/K.

We claim:

1. A resistive component comprising one or more resistive films wherein at least one of the resistive films is on the basis of CrSi, further wherein the resistive film on the basis of CrSi comprises 5–50 at. % Cr, 10–70 at. % Si, 5–50 at. % O and at least one compound selected from the group consisting of boride, carbide and nitride in the concentration of 1–50% at. %.

2. The resistive component as claimed in claim 1, wherein the resistive film on the basis of CrSi comprises 20–40 at. % Cr, 10–30 at. % Si, 10–40 at. % O and at least one element selected from the group consisting of boride, carbide and nitride in a concentration of 1–40 at. %.

3. The resistive component as claimed in claim 1, wherein the resistive film on the basis of CrSi comprises 25–35 at. % Cr, 15–25 at. % Si, 20–30 at. % O, and at least one element selected from the group consisting of boride, carbide and nitride in a concentration of 1–30 at. %.

4. The resistive component as claimed in claim 1, wherein the resistive film on the basis of CrSi comprises 10–30 at. % Cr, 20–60 at. % Si, 20–50 at. % O, and at least one element selected from the group consisting of boride, carbide and nitride in a concentration of 1–40 at. %.

5. The resistive component as claimed in claim 1, wherein the resistive film on the basis of CrSi comprises 16–20 at. % Cr, 35–45 at. % Si, 20–30 at. % O and 15–25 at. % C.

6. The resistive component as claimed in claim 1, wherein the resistive film on the basis of CrSi additionally comprises 1–20 at. % hydrogen.

7. The resistive component as claimed in claim 1, wherein the resistive film additionally comprises 1–5 at. % of one of the following selected from the group consisting of Ge, Ni, Co, Fe, Al, W, Mo, Ti, Ru and Cu.

8. The resistive component as claimed in claim 1, the resistive film on the basis of CrSi comprises a thickness in the range from 10 nm to 10 μm.

9. The resistive component as claimed in claim 1, further comprising a substrate, wherein the substrate comprises one of the following selected from the group consisting of $Al_2O_3$, BN, AlN, Si, SiC, $Si_3N_4$ and $SiO_2$.

* * * * *